June 12, 1962  H. FISCHER  3,039,018
HIGH TEMPERATURE PRODUCTION
Filed March 28, 1958

INVENTOR.
HEINZ FISCHER
BY
ATTORNEYS ns of a cylindrical assembly of parts embodying the invention; and

3,039,018
HIGH TEMPERATURE PRODUCTION
Heinz Fischer, 32 Scott Road, Belmont, Mass.
Filed Mar. 28, 1958, Ser. No. 724,774
2 Claims. (Cl. 315—36)
(Granted under Title 35, U.S. Code (1952), sec. 266)

The invention described herein may be manufactured and used by or for the United States Government for governmental purposes without payment to me of any royalty thereon.

This invention relates to the production of extremely high temperatures, and particularly to electrical methods and apparatus for high temperature production.

In my U.S. Patent No. 2,728,877, entitled "Apparatus for Obtaining Extremely High Temperatures," there is disclosed the concept of bridging a gap formed by spaced electrodes with an electric current which is projected across said gap by the breakdown voltage associated with the discharge of energy previously stored in a capacitor assembly surrounding a gas-filled chamber whose longitudinal axis coincides with the longitudinal axis of said spaced electrodes. The effectiveness of the operation, in terms of temperature generating capabilities depends largely upon bringing about a high ratio as between the rate of energy input to said gas-enshrouded "gap," on the one hand, and the rate of energy dissipation from the surrounding chamber, on the other.

As pointed out in my prior patent, an extremely high input/output ratio is assured by specially winding capacitance elements about said chamber to form a toroidal capacitor whose longitudinal axis coincides with a line joining the spaced electrodes at their points of minimum separation. The spaced electrodes are constituted by two circular metallic plates, each of which plates alternate turns of the capacitor assembly have their edges electrically bonded for maximum current transferring effectiveness.

The present invention provides methods and means whereby the rate of energy input is increased, thereby further increasing the high ratio of input-to-output energy rates heretofore attained.

The present invention also provides methods and means whereby the rate of energy output, during the critical interval for maximum temperature development, is reduced below the previously attained minimum output rate, thus bringing about a still greater advantage in input/output ratio.

Figure 1:
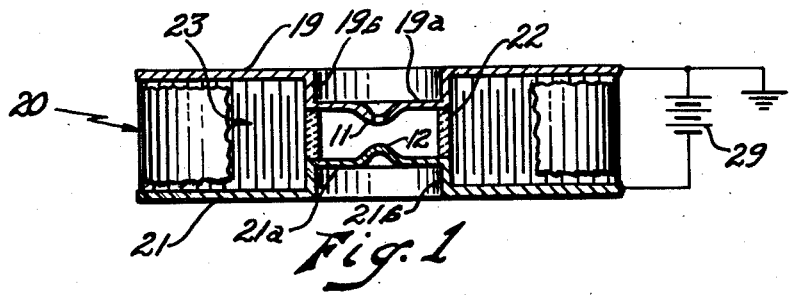
Figure 2:
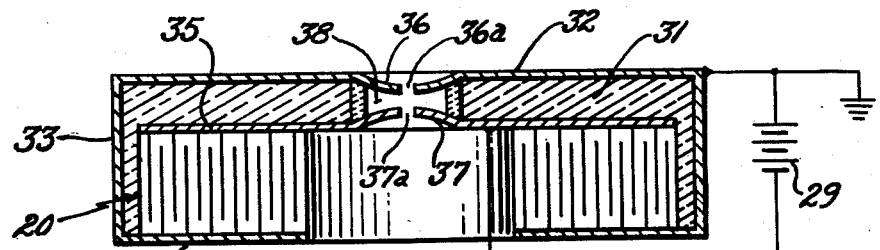
Figure 3:
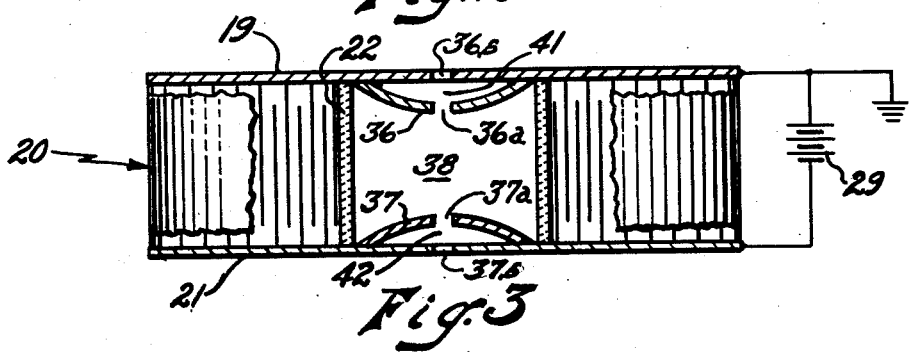
Figure 4:
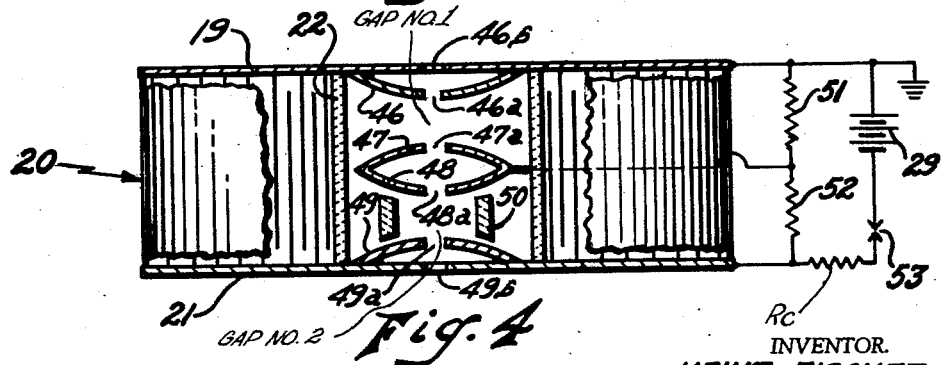

Other objects and characteristics of the invention will appear upon reference to the following description of several embodiments thereof, which embodiments are illustrated in the accompanying drawings wherein:

FIG. 1 is a view, partly in elevation and partly in axial section, of a cylindrical assembly of parts embodying the invention; and FIGS. 2, 3 and 4 are similar views of assemblies constituting alternative embodiments.

Referring first to FIG. 1, plates 19 and 21 are comparable to plates 19 and 21, respectively, of my prior patent except for the important difference that they are centrally depressed to form recessed panels 19a and 21a, respectively, which panels are in turn centrally depressed to form indentations 11 and 12 to serve as electrodes in much the same manner as electrodes 11 and 12 of my prior patent, except that instead of being mounted in a separate housing the electrodes 11, 12 of the present invention are integral parts of the electrical conducting plates 19,21, forming the terminals of the capacitor assembly 20. Moreover, instead of providing a gas receiving chamber as an element separate and distinct from the conducting plates, as in my prior patent, the present invention utilizes the conducting plates to form the upper and lower bounding walls of the gas chamber, with the lateral boundary being in the form of a circular sheet 22 of dielectric, heat resistant material such as quartz, whose outer diameter is preferably dimensioned so that shell 22 is congruous with the adjacent cylindrical portions 19b and 21b of plates 19 and 21, respectively. Thus the shell 22 combines with plate rims 19b and 21b to form a spool-like base upon which may be started the process of spirally winding the two strips 23 of metallic foil and the interleaving dielectric ribbon, corresponding to the elements designated by corresponding reference numerals in my prior patent, but with this difference: at least one complete layer of dielectric material is wrapped about the "spool" 19b—22—21b before starting the application of the metallic foil 23, so that alternate strips of the latter will have physical and electrical contact with the upper and lower plates 19 and 21, respectively, only along their alternating upper and lower edges.

The elimination of (a) the specially provided electrode elements 11, 12 of my prior patent, and (b) the specially provided electrode housing 13 of my prior patent, results in an acceleration of the energy input cycle in that both these factors tended to accentuate the "skin effects" and eddy current-promoting potentials which in turn are responsible for a considerable part of the effective inductance factor remaining in the electrical circuit as it exists in my prior patent. This effective inductance factor is reduced much more by incorporating the concepts illustrated in FIGS. 2 and 3, now to be described.

Referring to FIG. 2, the capacitor assembly is enclosed, along its upper and peripheral surfaces, in a hood 31 of insulating material such as Plexiglas, glass, quartz, or the like, which hood is metal-plated over all of its flat surfaces, as well as along its outer—but not its inner—peripheral surfaces. Upper metallic plating 32 and the outer peripheral metallic plating 33 electrically connect with flat metallic plate 34 to which alternate capacitor turns 23 are secured, while the metallic plating 35 electrically connects with capacitor turns 23. Platings 32 and 35 feed the inwardly directed discs 36 and 37, respectively, constituting the electrodes, as well as the upper and lower boundaries of the gas chamber 38.

These discs 36 and 37 may be of one piece or laminated structure, and may be centrally perforated, as indicated, at 36a and 37a, to permit observation of the electrical action, and to provide light radiation therethrough. The gas admitting and discharging provisions in all of the illustrated embodiments, although not shown, may be assumed to be substantially as indicated in my prior patent.

The metal plating 32, 33, 35 must be thin enough to avoid "skin effects," yet thick enough to carry the charging current from the high-voltage D.C. source 29 to the capacitor assembly and to carry the discharging current to the electrode discs 36, 37. To prevent possible "cross" eddy currents, the plating may be segmented.

The size of the chamber 38 may change with the application. In case of a small chamber the center hole itself may make up the side walls, since they are to be of insulating material. In the case of a needed larger chamber, the arrangement in FIG. 3 may be more advantageous. Here the chamber 38 is put back inside the capacitor, as was indicated in the original invention. Now, however, the electric connections 36, 37 to the electrode gaps 36a, 37a, may consist of insulating materials, which are metal plated for reduction of effective inductance, as previously discussed. Plates 19 and 21 in the FIG. 3 arrangement are centrally perforated to form viewing windows 36b and 37b, respectively, at the outer boundaries of ante-chambers 41, 42.

*Restriction of channel ("squeeze").*—The parameters taken into account so far determine the rate of energy put into the gap (channel). But it is just as important for the production of large temperatures that the energy be fed into a channel volume that is as small as possible. When unrestricted, the channel volume expands as a function of time. This is another reason why the energy has to be fed into the channel at a maximum rate. This need is already largely taken care of by the original invention and the proposed apparatus having minimum inductance L.

An additional method, however, for keeping the channel volume small involves restriction. This can be done by surrounding the spark gap with properly sized walls made of any insulating material. This restriction not only prevents the channel from expanding, but also increases the electrical resistance, which improves the efficiency of energy transfer from the capacitor into the channel. The following equations are pertinent.

(1)
$$V = \frac{1}{2\pi}\sqrt{\frac{1}{LC} - \frac{R^2}{4L^2}}$$ (frequency of the electric circuit)

$L$ = inductance (measured in microhenries)
$C$ = capacity (measured in microfarads)
$R = R_C + R_S$ = ohmic resistance of the complete circuit
   $R_C$ is the resistance of the outer circuit
   $R_S$ is the resistance of the channel (Case 1)   $R < 2\left(\frac{L}{C}\right)^{1/2}$ discharge oscillating (Case 2)   $R > 2\left(\frac{L}{C}\right)^{1/2}$ discharge aperiodic (Case 3)   $R = 2\left(\frac{L}{C}\right)^{1/2}$ ideal aperiodic case It has been found experimentally that with increasing current of the discharge the resistance $R_S$ decreases, and can become very small ( $10^{-2}$ ohms) in the case of an unrestricted channel. This means that in spite of very small inductance L of the coaxial capacitor discharge, the current of the discharge is still oscillating according to Case 1. Oscillating current on the other hand means mismatch and poor efficiency of energy transfer from the capacitor into the spark gap. So, if by restriction of the channel the resistance $R_S$ is raised, the efficiency of energy transfer is also raised. The efficiency of energy transfer into the channel is a maximum in Case 3. In other words, for the production of maximum temperature the restriction of the channel by the use of walls, tubing, aperture, etc., must be such that the resistance of the spark channel approaches the value for the ideal aperiodic case.

To find the proper diameter in which the discharge is "squeezed" properly is a somewhat intricate problem, since the expansion forces of the spark channel may become tremendous at extremely large gas temperatures in the channel. This is the case, for example, when large gas pressures are used, or what is equivalent to large density in the channel. So it may be advantageous if the restricting wall consist of liquids instead of solid material. By rotation of the chamber (which is partly filled with liquid), a cylindrical gap may be established in the center of the chamber.

A decrease of the gas pressure in the chamber, on the other hand, diminishes the expansion forces and makes the restriction of the channel technologically easier. At very small pressure (low density) the expansion forces of the spark channel may even be completely counterbalanced by the constricting influence of the selfmagnetic field (pinch effect), which, depending upon the spark current, may assume values as high as 100,000 gausses or more. In such case the spark channel may not need constricting walls. Hence, low gas pressure is favorable in respect to restriction of the channel volume.

*Two-gap coaxial capacitor discharge.*—Reduced gas pressure (less gas density) in the spark chamber leads directly to an increase of the gas temperature in the channel. This occurs if with a constant channel volume, the same amount of energy E can be transferred into the spark channel, and if at the same time the loss of energy from the channel does not increase substantially by going to smaller gas pressure. This conclusion of increased gas temperature follows from the well known energy equation of Boltzmann, given in the following form for a monatomic gas:

(2) $$E = \frac{3kT}{2} \times N + eV \times N + R - \text{loss}$$

where N is the gas density which reduces linearly with the gas pressure, if there is constant temperature in the spark chamber; $k$ is the Boltzmann constant; $eV$ the ionization energy; and R the radiation energy.

The channel volume can be kept constant by restriction, as was pointed out above. To the extent the loss is affected by reducing the pressure it will be mainly radiation loss, and greatly reduced. However, a definite difficulty lies in the assumption of a constant energy input E with decreasing pressure, since the breakdown voltage U as well as the channel resistance $R_S$ decreases in this case. On the other hand, the breakdown voltage has to be high for maximum energy transfer into the channel, as explained in the original patent, and the channel resistance $R_S$ has to be maintained substantially constant as explained in the preceding paragraph (Case 3). $R_S$ can be maintained substantially constant by proper squeezing of the channel as has already been discussed, but to compensate for decreasing gas pressure requires a different electric arrangement of the discharge. This is to be explained in the following.

In the case of high pressure, the voltage can be applied to the gap merely by charging the capacitor until breakdown voltage U is reached. Triggering of the discharge has not been considered essential up to this point. In the case of low gas pressure, the much smaller breakdown voltage U makes it necessary to gate the gap during the charging time of the capacitor, and to open it only when the full voltage has been reached. Another possibility is to apply the voltage to the gap in the form of a short time pulse. This can be done fairly simple by using two spark gaps instead of one, as indicated in FIG. 4. Gap 46a—47a (FIG. 4) serves as the gate for the second gap 48a—49a in which the extremely large temperatures are being produced. Here the toroidal capacitor 20 surrounds coaxially both spark gaps; 46 to 49, inclusive, are the connecting plates; and baffle 50 is a restriction of the channel as proposed above.

Gap No. 1 as shown at 46a—47a in FIG. 4 is dimensioned in such a way that it has a high breakdown voltage $U_1$, but a small spark resistance $R_S$ after the electric breakdown has occurred. That means that the channel in gap No. 1 is unrestricted in respect to expansion, using advantageous gas filling, which provides a large $U_1$ and a small $R_S$.

Gap No. 2 as shown at 48a—49a in FIG. 4, in which the extremely large temperatures are produced, on the other hand, has low gas pressure and provides restriction of the spark channel, either mechanically (as by restricting the walls) or magnetically, by the action of the accompanying magnetic field. Such restriction is desirable (and in a sense necessary, in order to raise the spark resistance $R_{S2}$ in No. 2 to the ideal aperiodic Case 3). The breakdown voltage $U_1$ of gap No. 1 must be much larger than that of $U_2$ of gap No. 2. A properly dimensioned voltage divider 51, 52 assures that the voltage applied to gap No. 2 during the charging (before the firing of No. 1) is lower than its breakdown voltage $U_2$.

The proposed arrangement works in the following order:

Capacitor 20 is charged by way of charging resistor $R_C$ until the total voltage $U = U_1 + U_2$ reaches the breakdown voltage $U_1$ of gap No. 1. Then gap No. 1 fires and puts almost the full voltage U on gap No. 2, which fires with a time delay $\Delta t$ that is small due to the large overvoltage U.

The energy loss in gap No. 1 is relatively small because of the intentionally small spark resistance $R_{S1}$, which we have found experimentally may be less than $10^{-3}$ ohms. This means that the energy loss in gap No. 1 can be held down to probably less than 5% of the total capacitor energy. The energy input into gap No. 2, on the other hand, can be made relatively large by proper restriction of the spark channel, as indicated in FIG. 4, thus raising the resistance $R_{S2}$ of gap No. 2.

It is essential that the voltage U build up fast over gap 2. The time of this build-up depends upon the rate of current build-up in gap 1. In other words, gap 1 should first draw current before gap 2 fires. This can be accomplished fairly simply by a large enough resistor 52 bridging gap No. 2, that is, to be gap between electro 48 and 49. A resistor of 10 ohms, for example, built to stand the full voltage U, can draw a maximum current of 1000 amps. from gap 1 if U equaled 10,000 volts. At that rate the charge flowing through this resistor within 5 $\mu$seconds would be only $Q=1000 \times 5 \times 156 = 5 \times 10^{-3}$ coulombs. Assuming a toroidal capacitor of 50 $\mu$farads, the total charge is $Q_0 = CU = 5 \times 10^{-5} \times 10^4 = 5 \times 10^{-1}$ coulombs, i.e., only 1% of $Q_0$ would be lost in 5 $\mu$seconds through a 10 ohm resistor bridging gap 2. After gap 2 fires, its resistance becomes small in comparison with the assumed 10 ohm resistor, and the current flow through this resistor becomes negligible.

There must be certainty, however, that gap 2 fires within a short enough time interval $\Delta t$, which is termed "time lag of breakdown." $\Delta t$ depends upon different parameters, and decreases strongly with the applied overvoltage. Assuming a static breakdown voltage of $U_2=1000$ volts, the factor of overvoltage would be $$\frac{U}{U2}=10$$

if $U=10,000$. One would expect the $\Delta t$ to be considerably shorter than 1 $\mu$second, especially if gap 2 is properly illuminated by short wave radiation (this radiation may be anything from ultraviolet or X-rays to radioactive particle bombardment). It is of considerable advantage in the effort to decrease $\Delta t$ to its minimum value for gap 2 to be illuminated directly from gap 1. This can be done either through a proper optical window in the electrodes of gaps 1 and 2, or by using reflecting walls. It is essential, however, that as much as possible of the short wave radiation emitted from gap 1 be transmitted into gap 2. Proper transmitting material and arrangement may be suggested if needed.

It is desirable that under certain conditions an electrical gas discharge with moderate current be maintained in gap 2 before gap 1 is fired. In this manner gap 2 may already be bridged by an ionized plasma (channel) when gap 1 fires, to open the gate for the coaxial capacitor discharge through gap 2. This firing of the discharge into an already existing channel serves several purposes such as: (a) various materials can be heated, evaporated, mixed or excited under conditions of a moderate gas discharge prior to being exposed to the extremely large temperatures of the coaxial capacitor discharge. It also means that favorable conditions for certain reactions, which in order to react need sufficient time, can be prepared prior to the high energy discharge. (b) It is relatively easy to maintain a centered D.C.-discharge thru gap 2, which guarantees that the following high energy discharge is centered too. To keep the high energy centered has, in the past, proven to be a problem. Centering is also important because of the so-called magnetic gun effect which pushes the channel to the side in the case of a non-centered discharge. (c) The already existing discharge channel reduces the shockwave which is normally connected with the high energy electric breakdown. It means that proper restriction of the channel as discussed herein will be much easier in such case where the gap is already bridged by a moderate discharge prior to the high energy discharge.

What is claimed is:

1. In a high temperature generating apparatus, the combination of a gas receiving chamber having parallel bounding walls of electrically conductive material, with centrally aligned indentations, and a peripheral joining wall of dielectric material and of a diameter of said indentations, to form a narrow channel at the center of said gas receiving chamber, a capacitor assembly adjacent said gas receiving chamber and electrically connected to said parallel bounding walls, and means for supplying charging current to said capacitor assembly until the field thereby generated in said chamber acquires sufficient intensity to produce capacitor-discharging current flow from one of said parallel bounding walls to the other, by way of said aligned indented portions of said bounding walls, said indented wall portions having aligned apertures to facilitate emission of light waves from said chamber during the capacitor-discharging portion of each cycle of operation.

2. In a high temperature generating apparatus, the combination of a gas receiving chamber having parallel bounding walls of electrically conductive material, with centrally aligned indentations, and a peripheral joining wall of dielectric material and of a diameter of said indentations, to form a narrow channel at the center of said gas receiving chamber, a capacitor assembly adjacent said gas receiving chamber and electrically connected to said parallel bounding walls, and means for supplying charging current to said capacitor assembly until the field thereby generated in said chamber acquires sufficient intensity to produce capacitor-discharging current flow from one of said parallel bounding walls to the other, by way of said aligned indented portions of said bounding walls, said parallel bounding walls being in the form of integral extensions of the terminal elements of said capacitor assembly, and an optical window aligned with said indentations for observation of spark discharge across said indentations.

References Cited in the file of this patent
UNITED STATES PATENTS

| 1,213,844 | Creighton | Jan. 30, 1917 |
| 2,290,526 | Berkey et al. | July 21, 1942 |
| 2,653,300 | Smullin | Sept. 22, 1953 |
| 2,728,877 | Fischer | Dec. 27, 1955 |
| 2,891,193 | Cunningham | June 16, 1959 |
| 2,923,852 | Scott et al. | Feb. 2, 1960 |

OTHER REFERENCES

Project Sherwood by Amasa S. Bishop, Addison-Wesley Pub. Co., Reading, Mass., 1958, pp. 6–14.

Proceedings of the Second United Nations International Conference on the Peaceful Uses of Atomic Energy, vol. 31, United Nations, Geneva, 1958, pp. 6, 30–32, 37, 43.

Nucleonics, February 1958, pp. 90, 91, 92 and 93.